United States Patent
Krishnan

(10) Patent No.: US 11,733,503 B2
(45) Date of Patent: Aug. 22, 2023

(54) SYSTEM AND A METHOD FOR GENERATING OUTPUT IMAGE DATA AND A MICROSCOPE

(71) Applicant: LEICA INSTRUMENTS (SINGAPORE) PTE. LTD., Singapore (SG)

(72) Inventor: Tushar Krishnan, St. Gallen (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/090,108

(22) Filed: Nov. 5, 2020

(65) Prior Publication Data
US 2021/0149176 A1    May 20, 2021

(30) Foreign Application Priority Data

Nov. 14, 2019   (DE) .......................... 102019130785.6

(51) Int. Cl.
*G02B 21/36*    (2006.01)
*G06T 7/90*    (2017.01)
(Continued)

(52) U.S. Cl.
CPC ........... *G02B 21/365* (2013.01); *G02B 21/16* (2013.01); *G06T 1/20* (2013.01); *G06T 7/90* (2017.01); *G06T 2207/10056* (2013.01)

(58) Field of Classification Search
CPC ........ G02B 21/365; G02B 21/16; G06T 7/90; G06T 1/20; G06T 2207/10056
(Continued)

(56) References Cited

U.S. PATENT DOCUMENTS

| | | | |
|---|---|---|---|
| 2010/0054582 A1* | 3/2010 | Koishi | ................ H04N 23/843 382/162 |
| 2011/0211732 A1 | 9/2011 | Rapaport | |

(Continued)

FOREIGN PATENT DOCUMENTS

| | | |
|---|---|---|
| CN | 102638688 A | 8/2012 |
| EP | 3205254 A1 | 8/2017 |

(Continued)

OTHER PUBLICATIONS

Moreland, Kenneth, "Diverging color maps for scientific visualization", Sandia National Lab. (SNL-NM), Albuquerque, NM (United States), 2009, International Symposium on Visual Computing, LNCS, vol. 5876, pp. 92-103, Springer, Berlin.
(Continued)

*Primary Examiner* — Allen C Wong
(74) *Attorney, Agent, or Firm* — 2SPL Patentanwälte PartG mbB; Yong Beom Hwang

(57) ABSTRACT

A system comprises one or more processors and one or more storage devices. The system is configured to receive first image data of a first image of an object from a first image sensor and receive second image data of a fluorescence image of the object from a second image sensor. Further, the system is configured to process the first image data and the second image data and generate combined image data of an output image of the object in a linear color space based on the processed first image data and the processed second image data. Additionally, the system is configured to convert the combined image data to a non-linear color space representation of the output image.

11 Claims, 5 Drawing Sheets

(51) Int. Cl.
   *G02B 21/16* (2006.01)
   *G06T 1/20* (2006.01)
(58) Field of Classification Search
   USPC .......................................................... 348/80
   See application file for complete search history.

(56) References Cited

U.S. PATENT DOCUMENTS

| | | | | |
|---|---|---|---|---|
| 2017/0366747 | A1* | 12/2017 | Wen | H04N 5/2258 |
| 2018/0124368 | A1* | 5/2018 | Liu | G06T 5/009 |
| 2018/0220052 | A1* | 8/2018 | Granneman | H04N 23/73 |
| 2018/0249089 | A1 | 8/2018 | Zhao et al. | |

FOREIGN PATENT DOCUMENTS

| | | |
|---|---|---|
| EP | 2540494 A1 | 9/2019 |
| EP | 3540494 A1 | 9/2019 |
| JP | 2005099892 A | 4/2005 |

OTHER PUBLICATIONS

Elliott, Jonathan T., et al., "Review of fluorescence guided surgery visualization and overlay techniques", Biomedical optics express, 2015, vol. 6, issue 10, pp. 3765-3782.
Kenneth D. Moreland: "Diverging Color Maps for Scientific Visualization (Expanded)", Advances in Visual Computing, 5th International Symposium, ISVC 2009, Nov. 1, 2009, pp. 1-20, XP055769118, USA.

\* cited by examiner

SYSTEM AND A METHOD FOR GENERATING OUTPUT IMAGE DATA AND A MICROSCOPE

CROSS REFERENCE TO RELATED APPLICATIONS

This application claims priority of German patent application number 102019130785.6 filed Nov. 14, 2019, the entire disclosure of which is incorporated by reference herein.

TECHNICAL FIELD

Examples relate to the generation of output image data based on at least two image sensor outputs including image data of a fluorescence image.

BACKGROUND

Fluorescence images often need to be overlaid to another image to locate the regions of fluorescence. For example, a fluorescence image of organic tissue may be overlaid onto a white light image of the organic tissue in order to be able to identify the fluorescent part of the organic tissue. Sometimes contrast and/or brightness of the overlaid images and/or the visibility of the fluorescent part are low, when displayed for the user.

SUMMARY

Hence, there is a need for an improved concept for generating image data of an image so that contrast and/or brightness of overlaid images and/or the visibility of the fluorescent part are improved when displayed for the user.

An embodiment relates to a system comprising one or more processors and one or more storage devices. The system is configured to receive first image data of a first image of an object from a first image sensor and receive second image data of a fluorescence image of the object from a second image sensor. Further, the system is configured to process the first image data and the second image data and generate combined image data of an output image of the object in a linear color space based on the processed first image data and the processed second image data. Additionally, the system is configured to convert the combined image data to a non-linear color space representation of the output image.

Another embodiment relates to a method for generating output image data. The method comprises receiving first image data of a first image of an object from a first image sensor and receiving second image data of a fluorescence image of the object from a second image sensor. Further, the method comprises processing the first image data and the second image data and generating combined image data of an output image of the object in a linear color space based on the processed first image data and the processed second image data. Additionally, the method comprises converting the combined image data to a non-linear color space representation of the output image.

BRIEF DESCRIPTION OF THE DRAWING VIEWS

Some examples of apparatuses and/or methods will be described in the following by way of example only, and with reference to the accompanying figures, in which FIG. 1 is a schematic illustration of a system for generating output image data;

DETAILED DESCRIPTION

Various examples will now be described more fully with reference to the accompanying drawings in which some examples are illustrated.

Figure 1:
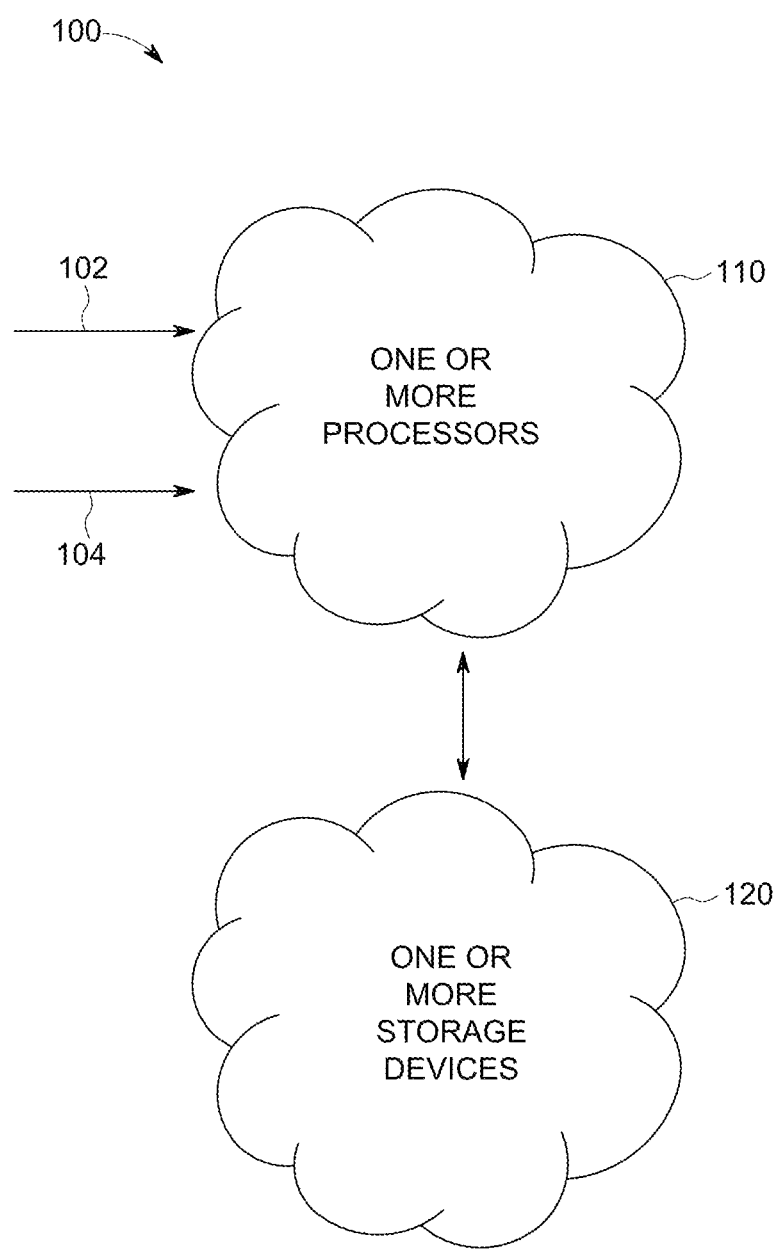

FIG. 1 shows a system for generating output image data. The system 100 comprises one or more processors 110 and one or more storage devices 120. The system 100 is configured to receive first image data 102 of a first image of an object from a first image sensor and receive second image data 104 of a fluorescence image of the object from a second image sensor. Further, the system 100 is configured to process the first image data 102 and the second image data 104 and generate combined image data of an output image of the object in a linear color space based on the processed first image data and the processed second image data. Additionally, the system 100 is configured to convert the combined image data to a non-linear color space representation of the output image.

By overlaying the first image with the fluorescence image, the identification of the locations of fluorescent parts on the object may be enabled. By converting the combined image to a non-linear color space representation, the overall visualization of the combined image may be improved. Further, the color reproduction of the first image (e.g. white light image) may be improved by the conversion. Furthermore, the fluorescence visualization may be improved over a larger range of settings (e.g. settings for the acquisition of the fluorescence image) by the conversion.

The object may be organic tissue (e.g. brain tissue) or another object which comprises parts that can be stimulated to emit fluorescence light.

The first image data 102 may be image data of a white light image caused by illumination of the object with white light or of an image caused by illumination with visible light of a specific light spectrum. The first image data 102 may comprise a pixel value for each pixel of the first image for each color dimension of the image (e.g. three color dimensions for RGB representation). The first image may be a white light image and/or visible light image of the object.

The first image sensor may have at least one maximum of sensitivity in a wavelength range of the visible light. For example, the first image sensor has a maximum of sensitivity at a wavelength between 575 nm and 650 nm (e.g. pixel for red light), a maximum of sensitivity at a wavelength between 500 nm and 550 nm (e.g. pixel for green light) and/or a maximum of sensitivity at a wavelength between 440 nm and 480 nm (e.g. pixel for blue light). The first image sensor may be a visible light image sensor (e.g. a Bayer sensor). The first image sensor may be part of a visible light camera (e.g. a Bayer camera). The first image sensor may be an external component connected to the system 100 or a part of the system 100. The first image sensor may be part of a first camera of a microscope.

The second image data 104 is image data of a fluorescence image (second image) caused by light emitted by fluorescent parts of the object, for example. The emission of the fluorescence light by the fluorescent parts of the object may be caused by illuminating the object with a stimulation light from a stimulation light source. For example, the stimulation light may have a maximum of intensity in a wavelength range between 600 nm and 800 nm (or between 650 nm and 750 nm). The second image data 104 may comprise a pixel value for each pixel of the fluorescence image. The final value acquired from the fluorescence image sensor may be a single fluorescence value for each pixel.

The second image sensor may have a maximal sensitivity at a wavelength of at least 800 nm (or at least 820 nm) and/or at most 900 nm (or at most 880 nm). The second image sensor may be an infrared light image sensor. The second image sensor may be an external component connected to the system 100 or a part of the system 100. The second image sensor may be part of a second camera of the microscope.

The first image data 102 may be generated by the first image sensor and provided to the system 100 for processing. The first image data 102 may be in a linear color space representation (e.g. linear RGB format) or in non-linear color space representation (e.g. sRGB format; standard RGB format). In other words, the first image data 102 may be linear color space image data of the first image or non-linear color space image data of the first image.

If the first image data 102 is linear color space image data, the first image data 102 may be processed without a format conversion as the image processing may work in the linear color space. For example, the processing of the first image data 102 comprises demosaicing (e.g. debayering) and/or vignetting compensation. The debayering the first image data 102 may convert the Bayer pattern pixel information to R (red), G (green) and B (blue) values for each pixel. The vignetting compensation may compensate for inhomogeneous illumination over the image.

If the first image data 102 is non-linear color space image data, the first image data 102 may be processed by converting the first image data 102 to a linear color space representation (e.g. linear RGB format). For example, the processing of the first image data 102 may comprise converting the non-linear color space image data of the first image to linear color space image data of the first image before further processing the linear color space image data of the first image. For example, the further processing of the linear color space image data of the first image comprises demosaicing (e.g. debayering) and/or vignetting compensation.

For example, the linear color space image data of the first image may be determined by:

$$C_n = \frac{C_{sRGB}}{C_{max}} \quad (1)$$

$$C_l = \begin{cases} \left(\frac{C_n + 0.055}{1.055}\right)^{2.4} & : C_n > 0.04045 \\ \frac{C_n}{12.92} & : C_n \leq 0.04045 \end{cases} \quad (2)$$

$$C_{linRGB} = C_l * C_{max} \quad (3)$$

$C_{sRGB}$ is a pixel value of the first image data, $C_{max}$ is the largest possible pixel value of the first image data, $C_n$ is a normalised pixel value based on the non-linear color space image data of the first image, $C_l$ is a normalized pixel value of a linear color space representation of the first image and $C_{linRGB}$ is a pixel value of the linear color space image data of the first image. C represents an element of R, G or B.

Equation (1) may be used to map the pixel values of the first image data 102 to an input value range (e.g. 0 to 1) of equation (2). Equation (3) may be used to map the pixel values provided by equation (2) to an input value range (e.g. 0 to 1) used by the further processing of the image data. If equation (2) can handle already the value range of the first image data 102 and/or the further processing can handle already the value range output by equation (2), equation (1) and/or (3) may be skipped. In this case, $C_l$ may be already a pixel value of the linear color space image data of the first image and/or the linear color space image data of the first image may be obtained based on equation (2) without normalizing the pixel values before applying equation (2). For example, equations (1)-(3) may be used to convert sRGB to linear RGB.

The second image data 104 may be generated by the second image sensor and provided to the system 100 for processing. The second image data 104 may be in a linear color space representation (e.g. linear RGB format) or in a non-linear color space representation (e.g. sRGB; standard RGB format). In other words, the second image data 104 may be linear color space image data of the fluorescence image or non-linear color space image data of the fluorescence image.

If the second image data 104 is linear color space image data, the second image data 104 may be processed without a format conversion as the image processing may work in the linear color space. For example, the processing of the second image data 104 comprises demosaicing (e.g. debayering), vignetting compensation and/or pseudo color adaptation. The pseudo color adaptation may add a user chosen or preset artificial color to the fluorescence pixels in accordance with their intensities.

If the second image data 104 is non-linear color space image data, the second image data 104 may be processed by converting the second image data 104 to a linear color space representation (e.g. linear RGB format) as it is described in connection with the first image data 102 (e.g. equations (1-3)). Afterwards, the further processing of the second image data 104 may comprise demosaicing (e.g. debayering), vignetting compensation and/or pseudo color adaptation.

The combined image data of the output image may be generated by adding pixel values or weighted pixel values of the processed first image data and the processed second image data. For example, the processed first image data may be obtained after convertion (if necessary), demosaicing and/or vignetting compensation. For example, the processed second image data may be obtained after convertion (if necessary), demosaicing, vignetting compensation and/or pseudo color adaptation. The output image may be a combination or an overlay of the first image and the fluorescence image.

The combined image data may be linear color space image data. For example, in order to provide an output format, which matches the input format expected or supported by a display, the combined image data is converted to a non-linear color space representation of the output image. The non-linear color space representation may be the sRGB format or another format supported by a display used for displaying the output image. For example, the combined image data may be converted to a non-linear color space image output format. The non-linear color space image output format (e.g. sRGB format) may correspond to a display input format of a display for displaying the output image. The non-linear color space representation of the output image may be output image data generated by the system 100. The non-linear color space representation of the output image may be provided at an output interface of the system 100 for a display.

For example, the non-linear color space representation of the output image may be determined by:

$$C_k = \frac{C_{linear}}{C_{max}} \quad (4)$$

$$C_t = \begin{cases} 12.92 * C_k & : C_k \leq 0.0031308 \\ 1.055 * (C_k)^{\frac{1}{2.4}} - 0.055 & : C_k > 0.0031308 \end{cases} \quad (5)$$

$$C_{sRGB} = C_t * C_{max} \quad (6)$$

$C_{linear}$ is a pixel value of the combined image data, $C_{max}$ is the largest possible pixel value of the combined image data, $C_k$ is a normalised pixel value based on the combined image data of the output image, $C_t$ is a normalized pixel value of a non-linear image data representation of the output image and $C_{sRGB}$ is a pixel value of the non-linear color space representation of the output image. C represents an element of R, G or B.

Equation (4) may be used to map the pixel values of the combined image data to an input value range (e.g. 0 to 1) of equation (5). Equation (6) may be used to map the pixel values provided by equation (5) to an output value range (e.g. 0 to 1) of the non-linear color space representation of the output image. If equation (5) can handle already the value range of the combined image data and/or the non-linear color space representation uses already the value range output by equation (5), equation (4) and/or (6) may be skipped. In this case, $C_t$ may be already a pixel value of the non-linear color space representation of the output image and/or the combined image data may be obtained based on equation (5) without normalizing the pixel values before applying equation (5). For example, equations (4)-(6) may be used to convert linear RGB to sRGB.

A linear color space may be a representation where an increase of a pixel value by a specific number, for example x+1 (e.g. 20+1), results in the same increase of the intensity (e.g. brightness) than an increase of another pixel value by the same specific number, for example y+1 (e.g. 30+1). For example, a color space may be linear, if a difference between two pixel values of the image data is directly proportional to a difference between the intensity of light detected by the two corresponding pixels of the image sensor. A linear color space may be a color space where a pixel value change is directly proportional to the change in the perceived intensity of light.

More details and aspects of the system 100 are mentioned in connection with the proposed concept and/or the one or more examples described above or below. The system 100 may comprise one or more additional optional features corresponding to one or more aspects of the proposed concept and/or of one or more examples described above or below.

Figure 2:
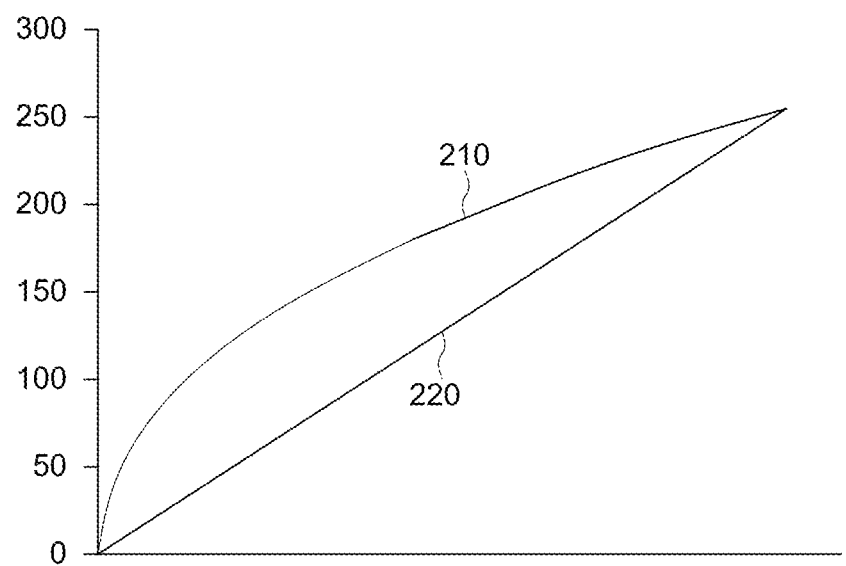
FIG. 2 is a diagram comparing linear RGB with sRGB.
Figure 3:
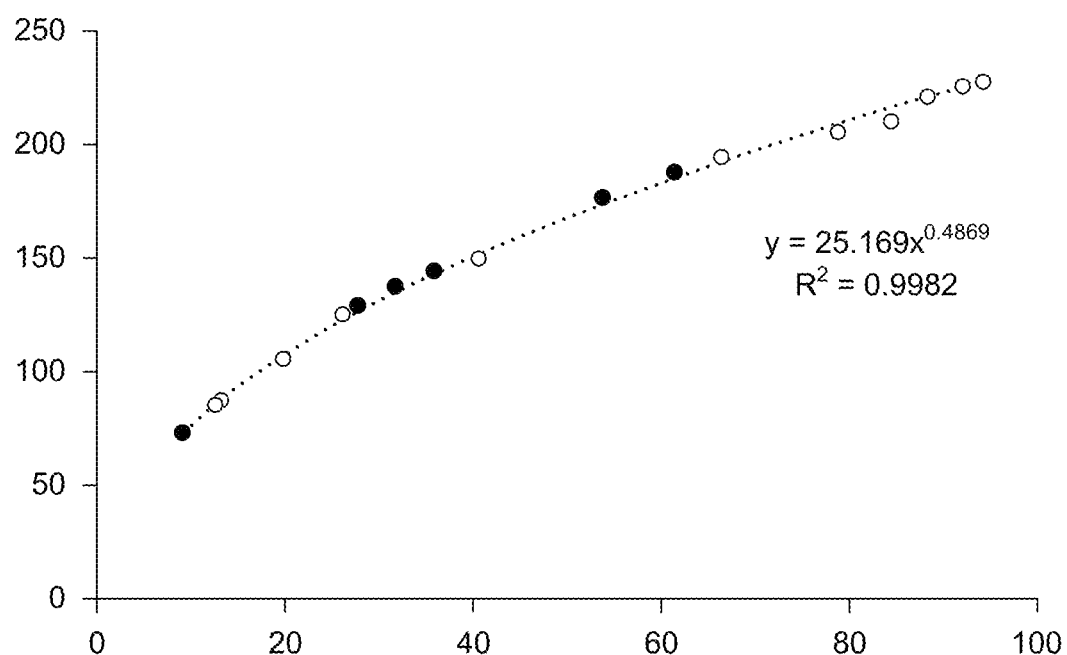
FIG. 3 is a diagram indicating pixel values vs. luxmeter values for a white light image.
Figure 4:
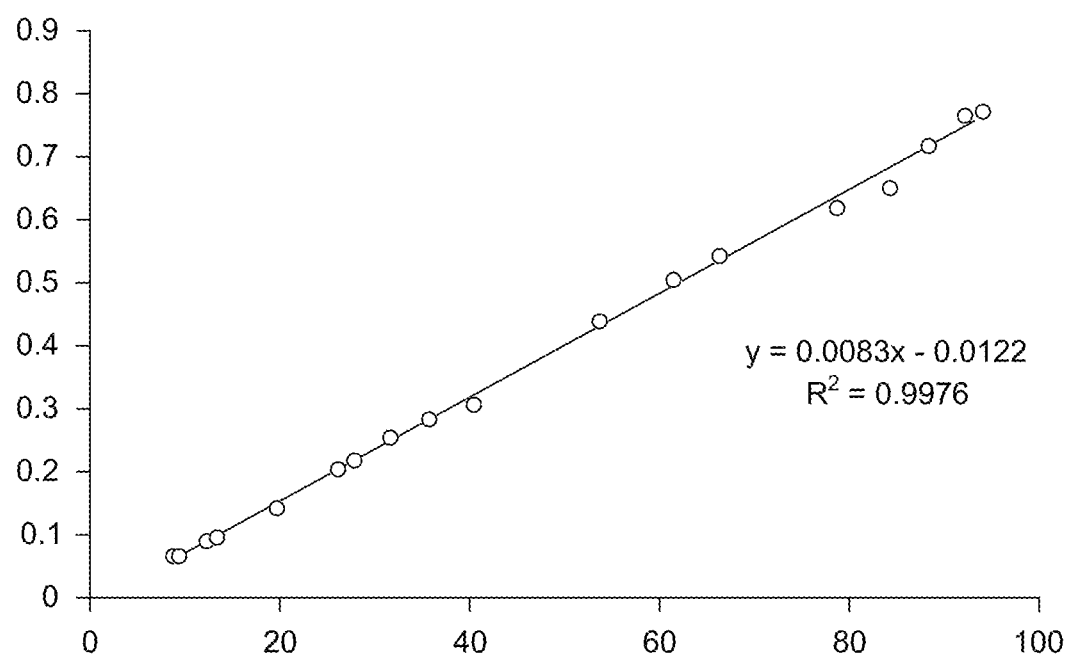
FIG. 4 is a diagram indicating linear pixel values vs. luxmeter values for a white light image.
Figure 5:
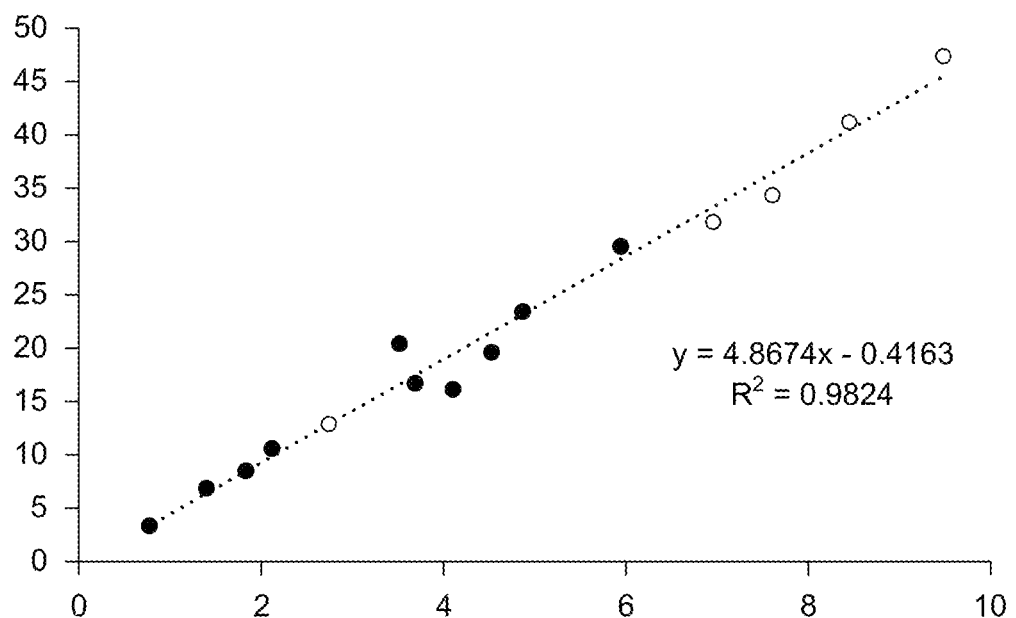
FIG. 5 is a diagram indicating linear pixel values vs. luxmeter values for a fluorescence image.

For example, FIG. 2 is a diagram comparing linear RGB 220 with sRGB 210. Further, FIG. 3 shows an example of pixel values of a white light image for different luxmeter values (in arbitrary units) of an image sensor (e.g. the first image sensor) providing an sRGB output. The diagram shows that the acquired pixel values share a non-linear relationship with the light intensity. FIG. 4 shows the pixel values of FIG. 3 after linearization (e.g. by using equation (2)). FIG. 4 shows that the pixel values post the linearization transformation share a linear relationship with light intensity. Further, FIG. 5 shows an example of pixel values of a fluorescence image for different luxmeter values (in arbitrary units) of a fluorescence image sensor (e.g. the second image sensor) providing a linear RGB output. In this example, the pixel values plotted against the corresponding luxmeter values are taken for the same single pixel as in FIGS. 3 and 4 from fluorescence images captured using a microscope. For this example of a fluorescence image, the acquired pixel values have a linear relationship with the light intensity.

In the example shown in FIG. 3-5, only the white light image acquisition has the sRGB format. The fluorescence image acquisition is linear and would not need to be linearized before image processing.

Figure 6:
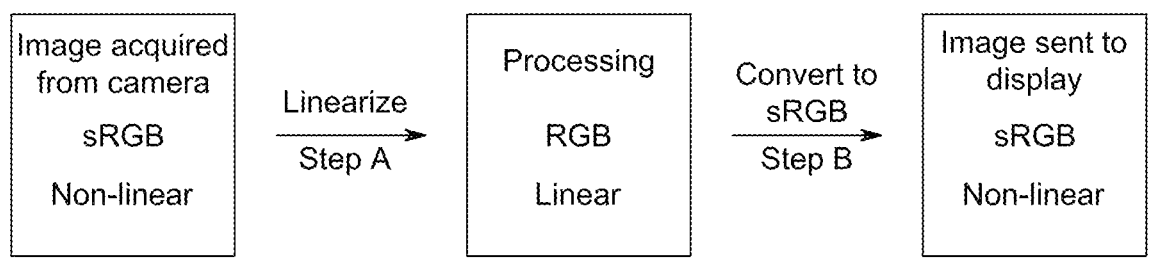
FIG. 6 is a schematic illustration of the processing of image data provided by an image sensor in sRGB format.

FIG. 6 shows an example of the processing of image data provided by a camera in sRGB format. For example, the first image sensor may provide the first image data of the acquired first image in sRGB format, which is a non-linear color space representation. In a step A, the first image data is linearized by a conversion to linear RGB format (e.g. by using equations (1-3)). Then the linear RGB image data is processed (e.g. demosaicing and/or vignetting compensation). The image processing algorithms may be available only in a linear color space. After image processing, the processed linear RGB image data of the first image may be combined (e.g. combined or overlaid) with linear RGB image data of a fluorescence image. In a step B, the combined image data is converted to sRGB. The non-linear sRGB image data of the combined image can be sent to a display (e.g. display expects image in sRGB).

Some embodiments relate to a linearization of the image processing pipeline for better image quality. The white light image acquired from a camera of a microscope may be in the sRGB format. For example, sRGB is a color space which is non-linear in nature and often used color space for representing images. FIG. 3 shows a schematic illustration of the relationship between light intensity for sRGB 210 and linear RGB 220.

According to an aspect, such images can be converted to a linear color space before any image processing steps are performed on them. For example, the image acquired by the camera is converted from sRGB to linear RGB, then the image processing operations are performed and the image is converted back to sRGB before rendering. This may lead to better image quality and a more sensitive fluorescence image seen on the screen.

For example, the linearization may be represented by step A in FIG. 6. FIG. 6 shows a schematic of a possible linearization in the image processing pipeline. After all the image processing is done, right before rendering (e.g. by a display), the image may be converted back to the sRGB format, because most displays (e.g. the monitors that are a part of a microscope ensemble) expect an image in sRGB format. This conversion may be represented by step B in FIG. 6. The non-linear power factor used in these conversions may be referred to as gamma. For example, the gamma value may be 2.2 or another value accepted by a display. Step A may be implemented by deactivating the sRGB conversion of the image sensor or the camera. Step B may be implemented by applying the equations of step B to the image after all the processing was done and before it is sent for rendering (e.g. at the display).

Some embodiments relate to a microscope comprising a system as described in connection with FIG. 1-6. Further, the microscope comprises the first image sensor configured to generate the first image data and the second image sensor configured to generate the second image data.

More details and aspects of the system, the first image sensor and the second image sensor are mentioned in connection with the proposed concept and/or the one or more examples described above or below. The microscope may comprise one or more additional optional features corresponding to one or more aspects of the proposed concept and/or of one or more examples described above or below.

Figure 7:
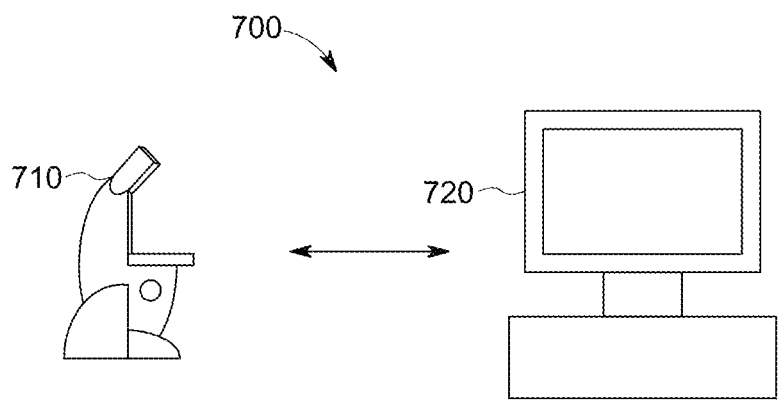
FIG. 7 is a schematic illustration of a system for generating output image data.

Some embodiments relate to a microscope comprising a system as described in connection with one or more of the FIGS. 1 to 6. Alternatively, a microscope may be part of or connected to a system as described in connection with one or more of the FIGS. 1 to 6. FIG. 7 shows a schematic illustration of a system 700 configured to perform a method described herein. The system 700 comprises a microscope 710 and a computer system 720. The microscope 710 is configured to take images and is connected to the computer system 720. The computer system 720 is configured to execute at least a part of a method described herein. The computer system 720 and microscope 710 may be separate entities but can also be integrated together in one common housing. The computer system 720 may be part of a central processing system of the microscope 710 and/or the computer system 720 may be part of a subcomponent of the microscope 710, such as a sensor, an actor, a camera or an illumination unit, etc. of the microscope 710.

The computer system 720 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 720 may comprise any circuit or combination of circuits. In one embodiment, the computer system 720 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 720 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 720 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 720 may also include a display device, one or more speakers, and a keyboard and/or controller, which can include a mouse, trackball, touch screen, voice-recognition device, or any other device that permits a system user to input information into and receive information from the computer system 720.

Figure 8:
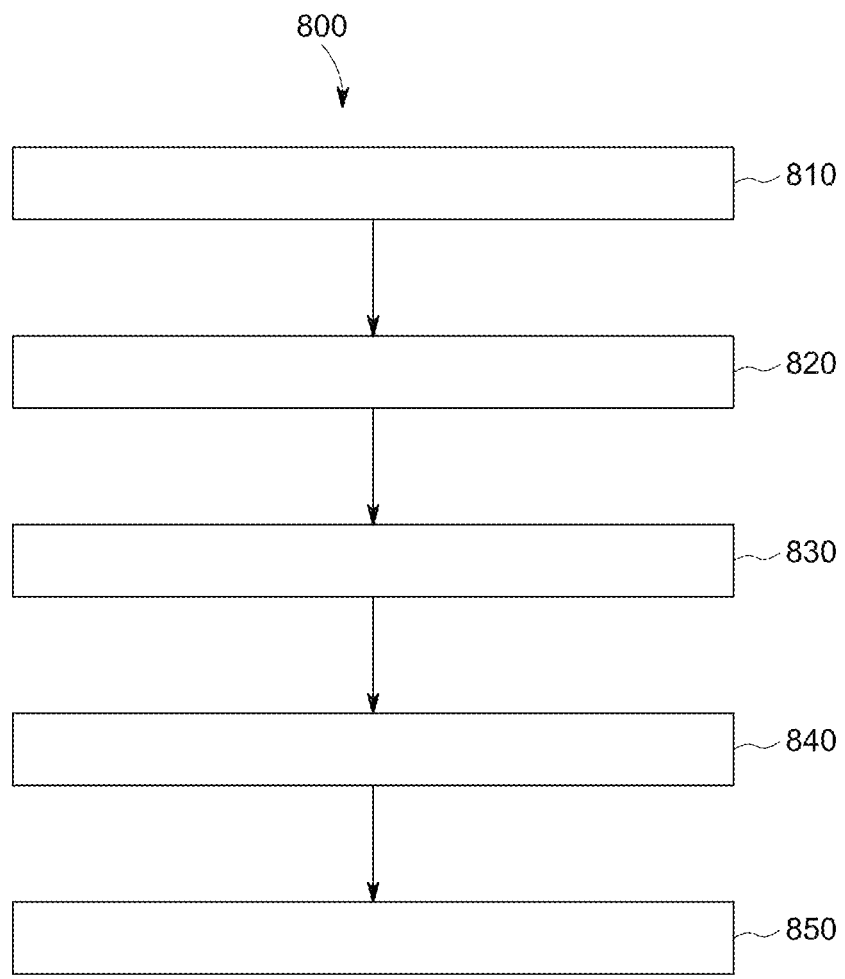
FIG. 8 is a flow chart of a method for generating output image data.

FIG. 8 shows a flowchart of a method for generating output image data. The method 800 comprises receiving 810 first image data of a first image of an object from a first image sensor and receiving 820 second image data of a fluorescence image of the object from a second image sensor. Further, the method 800 comprises processing 830 the first image data and the second image data and generating 840 combined image data of an output image of the object in a linear color space based on the processed first image data and the processed second image data. Additionally, the method 800 comprises converting 850 the combined image data to a non-linear color space representation of the output image.

More details and aspects of method 800 are mentioned in connection with the proposed concept and/or the one or more examples described above or below (e.g. FIGS. 1-7). The method 800 may comprise one or more additional optional features corresponding to one or more aspects of the proposed concept and/or of one or more examples described above or below.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 System for generating output image data
102 First image data
104 Second image data
110 One or more processors
120 One or more storage devices
210 sRGB
220 RGB
700 System
710 Microscope
720 Computer system
800 Method for generating output image data
810 Receiving first image data
820 Receiving second image data
830 Processing the first image data and the second image data
840 Generating combined image data
850 Converting the combined image data

What is claimed is:

1. A microscope comprising:
a first image sensor configured to generate first image data;
a second image sensor configured to generate second image data;
a system including one or more processors and one or more storage devices, wherein the system is configured to:
receive the first image data of a first image of an object from the first image sensor;
receive the second image data of a fluorescence image of the object from the second image sensor;
process the first image data and the second image data;
generate combined image data of an output image of the object in a linear color space based on the processed first image data and the processed second image data; and
convert the combined image data to a non-linear color space representation of the output image,
wherein the first image data is non-linear color space image data of the first image, and the processing the first image data comprises converting the non-linear color space image data of the first image to linear color space image data of the first image before further processing the linear color space image data of the first image.

2. The microscope of claim 1, wherein the second image data is linear color space image data of the fluorescence image.

3. The microscope of claim 1, wherein the linear color space image data of the first image is obtained based on:

$$C_l = \begin{cases} \left(\frac{C_n + 0.055}{1.055}\right)^{2.4} & : C_n > 0.04045 \\ \frac{C_n}{12.92} & : C_n \leq 0.04045 \end{cases}$$

wherein $C_n$ is a normalized pixel value based on the non-linear color space image data of the first image and $C_l$ is a normalized pixel value of a linear color space representation.

4. The microscope of claim 1, wherein processing the first image data comprises at least one of demosaicing and vignetting compensation.

5. The microscope of claim 1, wherein processing the second image data comprises at least one of demosaicing, vignetting compensation, and pseudo color adaptation.

6. The microscope of claim 1, wherein the non-linear color space representation of the output image is obtained based on:

$$C_t = \begin{cases} 12.92 * C_k & : C_k \leq 0.0031308 \\ 1.055 * (C_k)^{\frac{1}{2.4}} - 0.055 & : C_k > 0.0031308 \end{cases}$$

wherein $C_k$ is a normalized pixel value based on the combined image date and $C_t$ is a normalized pixel value of a non-linear image data representation.

7. The microscope of claim 1, wherein the non-linear color space representation is the sRGB format.

8. The microscope of claim 1, wherein the received second image data has linear RGB format.

9. The microscope of claim 1, wherein the received first image data has linear RGB format or sRGB format.

10. A method for generating output image data, the method comprising:
receiving first image data of a first image of an object from a first image sensor;

receiving second image data of a fluorescence image of the object from a second image sensor;

processing the first image data and the second image data;

generating combined image data of an output image of the object in a linear color space based on the processed first image data and the processed second image data; and converting the combined image data to a non-linear color space representation of the output image, wherein the first image data is non-linear color space image data of the first image, and the processing the first image data comprises converting the non-linear color space image data of the first image to linear color space image data of the first image before further processing the linear color space image data of the first image.

11. A non-transitory computer-readable medium storing a computer program comprising instructions which, when the instructions are executed by a processor, cause the processor to perform the method according to claim 10.

* * * * *